(12) United States Patent
Umehara et al.

(10) Patent No.: US 8,989,477 B2
(45) Date of Patent: Mar. 24, 2015

(54) PROCESS MONITORING DEVICE AND PROCESS MONITORING METHOD IN SEMICONDUCTOR MANUFACTURING APPARATUS AND SEMICONDUCTOR MANUFACTURING APPARATUS

(71) Applicant: Tokyo Electron Limited, Tokyo (JP)

(72) Inventors: Yasutoshi Umehara, Tokyo (JP); Motoi Okada, Hokkaido (JP); Shuji Iwanaga, Kumamoto (JP)

(73) Assignee: Tokyo Electron Limited, Tokyo (JP)

( * ) Notice: Subject to any disclaimer, the term of this patent is extended or adjusted under 35 U.S.C. 154(b) by 94 days.

(21) Appl. No.: 13/783,624

(22) Filed: Mar. 4, 2013

(65) Prior Publication Data

US 2013/0236088 A1 Sep. 12, 2013

(30) Foreign Application Priority Data

Mar. 7, 2012 (JP) ................................. 2012-050379
Dec. 14, 2012 (JP) ................................. 2012-273207

(51) Int. Cl.
*G06K 9/00* (2006.01)
*G06T 7/00* (2006.01)

(52) U.S. Cl.
CPC ....... *G06T 7/001* (2013.01); *G06T 2207/10016* (2013.01); *G06T 2207/30148* (2013.01)
USPC ............ 382/144; 382/141; 382/145; 382/149

(58) Field of Classification Search
USPC ...................... 382/141, 144, 145, 149; 438/14
See application file for complete search history.

(56) References Cited

U.S. PATENT DOCUMENTS

| 7,410,737 | B2 * | 8/2008 | Levin et al. ...................... 430/30 |
| 8,285,055 | B1 * | 10/2012 | Barnes et al. ................. 382/195 |
| 2006/0078189 | A1 * | 4/2006 | Hosoya et al. ................ 382/149 |
| 2007/0105245 | A1 * | 5/2007 | Funakoshi et al. .............. 438/14 |

FOREIGN PATENT DOCUMENTS

| JP | 2006-90901 A | 4/2006 |
| JP | 2011-14849 A | 1/2011 |
| JP | 2013132682 A * | 7/2013 .............. B21C 51/00 |

* cited by examiner

*Primary Examiner* — Gregory F Cunningham
(74) *Attorney, Agent, or Firm* — Rothwell, Figg, Ernst & Manbeck, P.C.

(57) ABSTRACT

Provide is a process monitoring device in a semiconductor manufacturing apparatus that can readily and reliably monitor the process in the semiconductor manufacturing apparatus. The process monitoring device includes a storage unit that stores a normal state moving image data indicating a normal state of the process; an image capturing unit that captures an image of a state of the process to be monitored to acquire a moving image data; an abnormality level calculation unit configured to extract a feature amount for each frame of the moving image data and the normal state moving image data, and calculate an abnormality level based on the extracted feature amount; and a display unit that displays the abnormality level calculated by the abnormality level calculation unit in association with a frame position of the moving image data.

9 Claims, 11 Drawing Sheets

PROCESS MONITORING DEVICE AND PROCESS MONITORING METHOD IN SEMICONDUCTOR MANUFACTURING APPARATUS AND SEMICONDUCTOR MANUFACTURING APPARATUS

CROSS-REFERENCE TO RELATED APPLICATIONS

This application is based on and claims priority from Japanese Patent Application Nos. 2012-050379, filed on Mar. 7, 2012, and 2012-273207, filed on Dec. 14, 2012, with the Japan Patent Office, the disclosure of which is incorporated herein in their entireties by reference.

TECHNICAL FIELD

The present disclosure relates to a process monitoring device of a semiconductor manufacturing apparatus, a process monitoring method of the semiconductor manufacturing apparatus, and the semiconductor manufacturing apparatus.

BACKGROUND

In a manufacturing process of a semiconductor manufacturing apparatus, there is known a technique in which various processes conducted in the semiconductor manufacturing apparatus are monitored by capturing images of the processes from a monitor camera and the like. See, for example, Japanese Patent Laid-Open No. 2011-14849. In a case where an image of a process is captured by a monitor camera for monitoring the process, such as for example, an application process of photoresist in an application apparatus in which the photoresist is applied on a semiconductor wafer or a development process for the photoresist subjected to exposure in a development apparatus, to monitor whether or not an event having abnormality is occurred, when a specific event is monitored of which a normal state or an abnormal state can be clearly distinguished as in, for example, flowing down of liquid from a nozzle, it can be electronically detected whether there is an abnormality or not.

However, with respect to a typical abnormality detection, a method has been employed in which a moving image composed of captured process images is stored as data, and after detection of an occurrence of abnormality, a module of a process apparatus through which a semiconductor wafer where an abnormality is occurred has passed is investigated and an abnormality of the process is confirmed by an operator with a visual inspection.

SUMMARY

According to an aspect of the present disclosure, there is provided a process monitoring device in a semiconductor manufacturing apparatus which monitors the state of the process of the semiconductor manufacturing apparatus which processes a substrate to be processed. The process monitoring device in the semiconductor manufacturing apparatus includes: a storage unit that stores a normal state moving image data indicating a normal state of the process; an image capturing unit that captures an image of a state of the process to be monitored to acquire a moving image data; an abnormality level calculation unit configured to extract feature amount for each frame of the moving image data acquired by the image capturing unit and the normal state moving image data, and calculate an abnormality level based on the extracted feature amount; and a display unit that displays the abnormality level calculated by the abnormality level calculation unit in association with a frame position of the moving image data.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

When an operator visually inspects the moving image captured by the monitor camera as described above, there are problems in that there is a high possibility of overlooking an abnormality event being occurred and ended in a short period, and an experienced skill is needed for monitoring. Further, there is also a problem that if abnormality occurs once, it successively causes a defect to, for example, a semiconductor wafer, and the burdens on reworking becomes large. Further, there is also a problem in that it is difficult to detect a predictive symptom of an abnormality before the abnormality actually occurs.

The present invention has been made in an effort to solve the problems and intends to provide a process monitoring device of a semiconductor manufacturing apparatus that can easily and reliably monitor the process of the semiconductor manufacturing apparatus as compared to a conventional technique, a process monitoring method of a semiconductor manufacturing apparatus, and a semiconductor manufacturing apparatus.

According to a first aspect of the present disclosure, there is provided a process monitoring device in a semiconductor manufacturing apparatus which monitors a state of the process in the semiconductor manufacturing apparatus which processes a substrate to be processed. The process monitoring device in the semiconductor manufacturing apparatus includes: a storage unit that stores a normal state moving image data indicating a normal state of the process; an image capturing unit that captures an image of a state of the process to be monitored to acquire an moving image data; an abnormality level calculation unit configured to extract feature amount for each frame of the moving image data acquired by the image capturing unit and the normal state moving image data and calculate an abnormality level based on the extracted feature amount; and a display unit that displays the abnormality level calculated by the abnormality level calculation unit in association with a frame position of the moving image data.

In the process monitoring device, the display unit displays a change for each frame of the moving image data of the abnormality level in a graph and designates a position on the graph to display the moving image data corresponding to the designated position on the graph.

The process monitoring device further includes a threshold storing unit that stores a threshold of the abnormality level, and a abnormality determination unit that when comparing the threshold stored in the threshold storing unit and the abnormality level calculated by the abnormality level calculation unit, if the calculated abnormality level exceeds the threshold, issuing an abnormality occurrence alert.

In the process monitoring device, the abnormality level calculation unit calculates the abnormality level from a ST-patch feature.

According to a second aspect of the present disclosure, there is provided a process monitoring method of a semiconductor manufacturing apparatus which processes a substrate to be processed. The process monitoring method of the semiconductor manufacturing apparatus includes: storing a normal state moving image data indicating a normal state of the process; capturing an image of state of the process to be monitored and acquiring the moving image data; extracting feature amount for each frame of the moving image data in normal state to calculate an abnormality level based on the extracted feature amount; and displaying the abnormality level calculated by the abnormality level calculation unit in association with a frame position of the moving image data.

In the process monitoring method, the display unit displays a change for each frame of the moving image data of the abnormality level in a graph and designates a position on the graph to display the moving image data corresponding to the designated position on the graph.

The process monitoring method further includes storing a threshold of the abnormality level, and issuing an abnormality occurrence alert, when comparing the threshold stored in the threshold storing unit and the abnormality level calculated by the abnormality level calculation unit, if the calculated abnormality level exceeds the threshold.

In the process monitoring method, the abnormality level calculation unit calculates the abnormality level from a ST-patch feature.

According to a third aspect of the present disclosure, there is provided a semiconductor manufacturing apparatus processing a substrate to be processed. The semiconductor manufacturing apparatus is provided with a process monitoring device in a semiconductor manufacturing apparatus, the process monitoring device includes; a storage unit that stores a normal state moving image data indicating a normal state of the process; an image capturing unit that captures an image of state of the process to be monitored to acquire the moving image data; an abnormality level calculation unit configured to extract feature amount for each frame of the moving image data in normal state and calculate an abnormality level based on the extracted feature amount; and a display unit that displays the abnormality level calculated by the abnormality level calculation unit in association with a frame position of the moving image data.

According to a present disclosure, it is possible to provide a process monitoring device of a semiconductor manufacturing apparatus that can more easily and reliably monitor the process of the semiconductor manufacturing apparatus as compared to a conventional technique, a process monitoring method of a semiconductor manufacturing apparatus, and a semiconductor manufacturing apparatus.

Hereinafter, embodiments of the present disclosure will be described with reference to the accompanying drawings.

Figure 1:
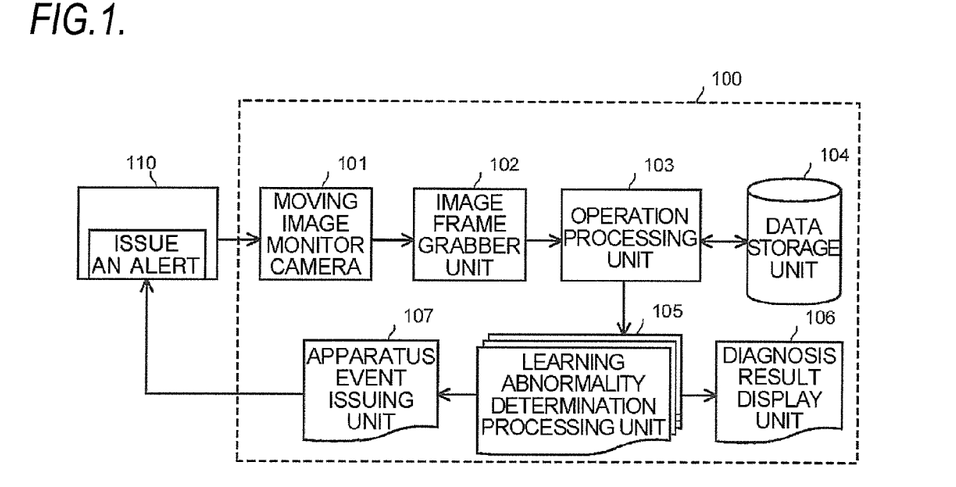
FIG. 1 is a view illustrating the configuration of a process monitoring device of a semiconductor manufacturing apparatus according to an embodiment of the present disclosure.

FIG. 1 is a block diagram illustrating the configuration of a process monitoring device of a semiconductor manufacturing apparatus according to an exemplary embodiment of the present disclosure. In FIG. 1, a reference numeral 100 denotes a process monitoring device of a semiconductor manufacturing apparatus, and a reference numeral 110 denotes a semiconductor manufacturing apparatus which performs a predetermined processing on the substrate to be processed. Further, an explanation of the embodiment of the present disclosure will be made by exemplifying a coating and development apparatus 110 which performs an application process of photoresist and a development process of photoresist on a semiconductor wafer as a substrate to be processed.

A process monitoring device 100 of the semiconductor manufacturing apparatus is provided with a moving image monitor camera 101 built in coating and development apparatus 110 and is disposed at a position where an image of a process to be monitored can be captured. In the present embodiment, for example, moving image monitor camera 101 may be disposed at a position where the image of a chemical liquid application unit of coating and development apparatus 110, that is, a chemical liquid supply nozzle (e.g., developing liquid supply nozzle or resist supply nozzle) of a spin coating apparatus or a semiconductor wafer being rotated can be captured by photographing.

Further, process monitoring device 100 of the semiconductor manufacturing apparatus is provided with an image frame grabber unit 102, an arithmetic processing unit 103 having a CPU and memory, a data storage unit 104 including a hard disk and the like, a learning abnormality determination processing unit 105, a diagnosis result display unit 106, and an apparatus event issuing unit 107.

A moving image signal from moving image monitor camera 101 is input to arithmetic processing unit 103 as moving image data through image frame grabber unit 102. The moving image data input to arithmetic processing unit 103 is stored in data storage unit 104 as a moving image data. Further, the moving image signal input to arithmetic processing unit 103 is subjected to an arithmetic processing and the moving image data subjected to the arithmetic processing is input to learning abnormality determination processing unit 105.

Figure 2:
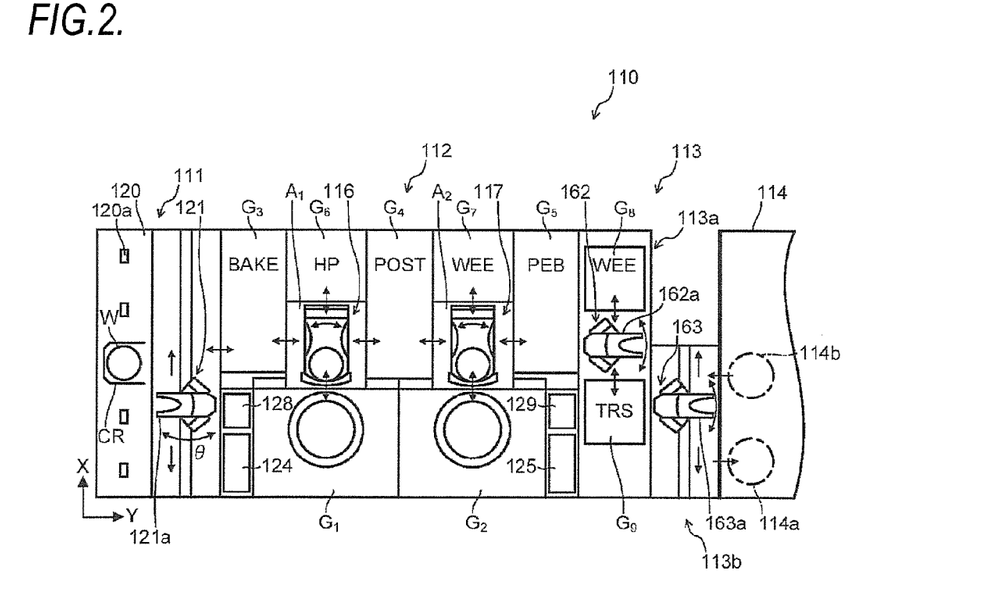
FIG. 2 is a front view illustrating the configuration of a semiconductor manufacturing apparatus according to an embodiment of the present disclosure.
Figure 3:
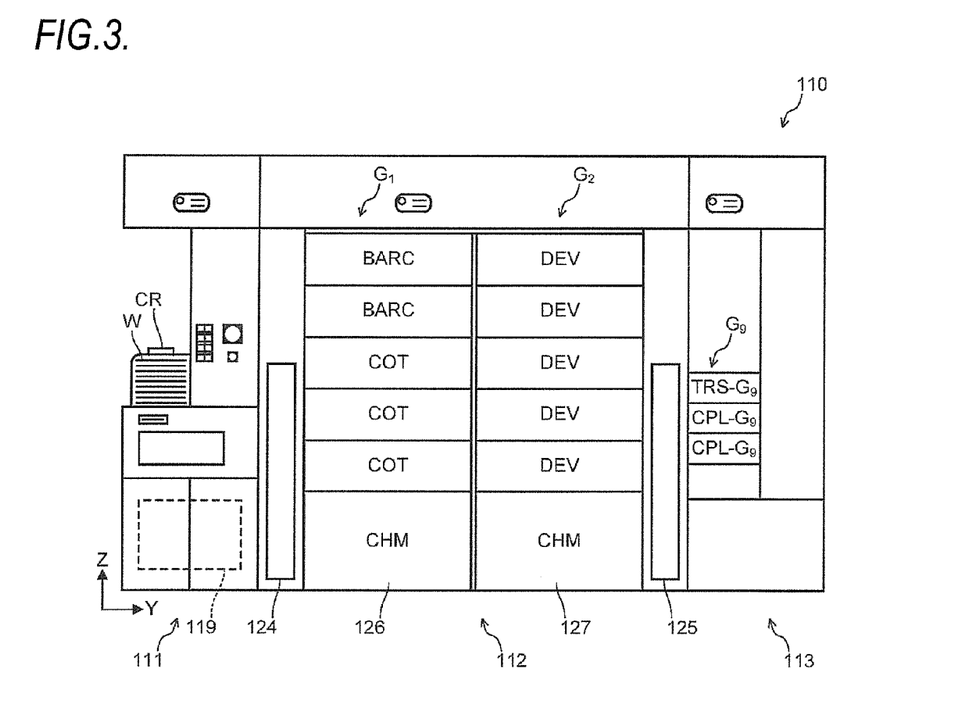
FIG. 3 is a plan view illustrating the configuration of the semiconductor manufacturing apparatus according to the embodiment of the present disclosure.
Figure 4:
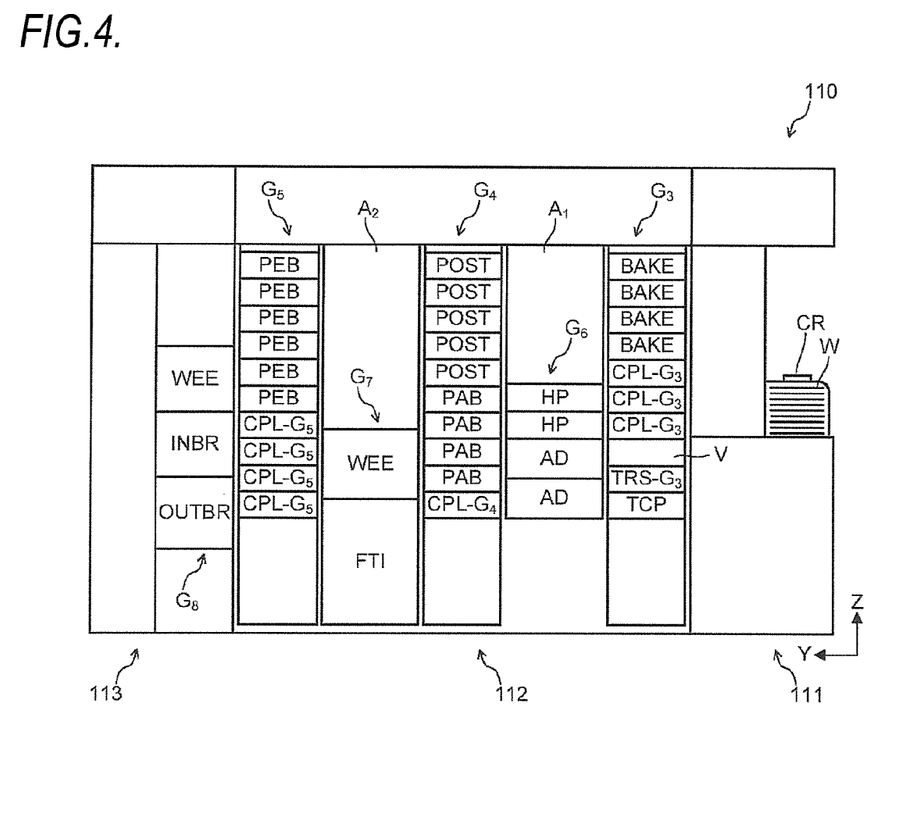
FIG. 4 is a rear view illustrating the configuration of the semiconductor manufacturing apparatus according to the embodiment of the present disclosure.

Subsequently, the configuration of coating and development apparatus 110 will be described with reference to FIG. 2 to FIG. 4. FIG. 2 is a plan view, FIG. 3 is a front view and FIG. 4 is a rear view thereof. Coating and development apparatus 110 includes a cassette station 111, a processing station 112 having a plurality of processing units, and an interface station 113 installed adjacent to processing station 112 transferring a semiconductor wafer W between processing station 112 and an exposure device 114.

A wafer cassette CR in which plural sheets of the semiconductor wafer W to be processed in coating and development apparatus 110 are accommodated horizontally is carried into cassette station 111 from other system. Further, reversely, the wafer cassette CR in which the semiconductor wafer W for which a resist processing is completed in coating and development apparatus 110 is accommodated is carried out from cassette station 111 to other system. Further, cassette station 111 transports the semiconductor wafer W between the wafer cassette CR and processing station 112.

As illustrated in FIG. 2, a cassette rack 120 extending along the X-direction is installed at an end portion (end portion in the Y-direction of FIG. 2) of an entrance side of cassette station 111. A plurality (e.g., five in FIG. 2) of positioning protrusions 120a are disposed in a single row along the X-direction on cassette rack 120, and the wafer cassette CR is arranged to be disposed at a position of positioning protrudes 120a in a state that the carrying-in and carrying-out port of the wafer cassette CR is oriented toward processing station 112.

A wafer transportation mechanism 121 is installed in cassette station 111 to be located between cassette rack 120 and processing station 112. The wafer transportation mechanism 121 includes a pick 121a for transporting wafers and pick 121a is movable in a cassette arrangement direction (X-direction) as well as a semiconductor wafer W arrangement direction (Z-direction) in the wafer cassette CR. Pick 121a for transporting wafer is also rotatable in the θ-direction as represented in FIG. 2. Accordingly, pick 121a for transporting wafer can access any wafer cassette CR, and a transition unit TRS-$G_3$ installed at a third processing unit group $G_3$ of processing station 112 to be described below.

In processing station 112, a first processing unit group G1 and a second processing unit group G2 are disposed sequentially from cassette station 111 side, at the front side of a system. Further, a third processing unit group $G_3$, a fourth processing unit group $G_4$ and a fifth processing unit group $G_5$ are disposed sequentially from cassette station 111, at the rear side of the system. Further, a first major transportation unit $A_1$ is disposed between the third processing unit group $G_3$ and the fourth processing unit group $G_4$, and a second major transportation unit $A_2$ is disposed between the fourth processing unit group $G_4$ and a fifth processing unit group $G_5$. A sixth processing unit group $G_6$ is disposed at the rear side of first major transportation unit $A_1$ and a seventh processing unit group $G_7$ is disposed at the rear side of the second major transportation unit $A_2$.

As illustrated in FIGS. 2 and 3, in first processing unit group $G_1$, five spinner type processing units, for example, three application units COTs and two coating units BARCs which form an antireflective film preventing light from being reflected during exposure, are disposed to be stacked on each other in a total of five stages serving as liquid supply units that perform a predetermined processing on a semiconductor wafer W mounted on a spin chuck within a cup. Further, five spinner type processing units, for example, five development units DEVs are disposed to be stacked on each other in five stages in the second processing unit group $G_2$. Moving image monitor camera 101 illustrated in FIG. 1 is disposed in each of the application unit COT, coating unit BARC and development unit DEV, and processes of these units are monitored by process monitoring device 100 of the semiconductor manufacturing apparatus.

As illustrated in FIG. 4, in third processing unit group G3, a temperature adjustment unit TCP, a transition unit TRS-G3 which serves as a delivery unit of the semiconductor wafer W between cassette station 111 and first major transportation unit A1, a spare space V in which a desired oven type processing unit and the like can be installed, three high accuracy temperature control units CPL-$G_3$, performing a heating process on a semiconductor wafer W under a high accuracy temperature control and four high temperature thermal processing units BAKEs, are disposed sequentially from the bottom to be stacked on each other in a total of ten stages.

In fourth processing unit group $G_4$, a high accuracy temperature control unit CPL-$G_4$, four prebake units PAB that perform a heating process on a semiconductor wafer W after having been subjected to a resist application, and five postbake units POST that perform a heating process on a semiconductor wafer W after having been subjected to a development process, are disposed sequentially from the bottom to be stacked on each other in a total of ten stages.

In fifth processing unit group G5, four high accuracy temperature control units CPL-$G_5$, and six post exposure bake unit PEB that perform a heating process on a semiconductor wafer W subjected to an exposure process but not subjected to a development process, are disposed sequentially from the bottom to be stacked on each other in a total of ten stages.

All of the high temperature processing unit BAKE, the prebake unit PAB, the postbake unit POST, and the post exposure bake unit PEB installed at the third to fifth processing unit groups $G_3$ to $G_5$ have, for example, the same structure and constitutes a heating processing unit. Further, a light irradiation mechanism which irradiates light (e.g., ultraviolet ray) on the semiconductor wafer W is installed at a heating unit EXB for expanding swelling agent, in addition to a heating mechanism.

A number of stacked stages and a disposition of units of the third to fifth processing unit group $G_3$ to $G_5$ are not limited to those as illustrated, and can be arbitrarily set.

Two adhesion units ADs and two heating units HPs are disposed sequentially from the bottom to be stacked on each other in a total of four stages in the sixth processing unit group $G_6$.

A film thickness measurement device FTI which measures the thickness of resist film and a perimeter exposure device WEE which selectively exposes only an edge portion of the semiconductor wafer W are disposed sequentially from the bottom to be stacked on each other in two stages in the seventh processing unit group $G_7$.

As illustrated in FIG. 2, a first major wafer transportation apparatus device 116 is installed in a first major transportation unit $A_1$ and first major wafer transportation apparatus device 116 is able to selectively access each of the units provided in first processing unit group $G_1$, third processing unit group $G_3$, fourth processing unit group $G_4$ and sixth processing unit group $G_6$.

A second major wafer transportation apparatus device 117 is installed in a second major transportation unit $A_2$ and second major wafer transportation apparatus device 117 is able to selectively access each of the units provided in second processing unit group $G_2$, fourth processing unit group $G_4$, fifth processing unit group $G_5$, and seventh processing unit group $G_7$.

Three arms for holding the semiconductor wafer W are disposed to be stacked in an up and down direction in first major wafer transportation apparatus device 116 and second major wafer transportation apparatus device 117. First and second major wafer transportation devices 116 and 117 are configured such that the semiconductor wafer W is held by the arms to be transported in each of the X-direction, the Y-direction, the Z-direction and the θ-direction.

As illustrated in FIG. 2, a liquid temperature control pump 124 and a duct 128 are installed between first processing unit group $G_1$ and cassette station 111, and a liquid temperature control pump 125 and a duct 129 are installed between second processing unit group $G_2$ and interface station 113. Liquid temperature control pumps 124 and 125 serve to supply a predetermined processing liquid to first processing unit group $G_1$ and second processing unit group $G_2$, respectively. Further, ducts 128 and 129 serve to allow clean air from air conditioning equipment installed outside of coating and development apparatus 110 to be supplied into the respective processing unit groups $G_1$ to $G_5$.

First processing unit group G1 to seventh processing unit group $G_7$ are detachable for maintenance and a panel at the rear side of the processing station 112 is also detachable or can be opened and closed. Further, as illustrated in FIG. 3, chemical units CHMs 126 and 127 which supply a predetermined processing liquid to first processing unit group G1 and second processing unit group $G_2$, is installed below first processing unit group $G_1$ and second processing unit group $G_2$.

Interface station 113 is configured by a first interface station 113a at processing station 112 side and a second interface station 113b at exposure device 114 side. A first wafer transporter 162 is disposed in first interface station 113a to face an opening of fifth processing unit group $G_5$, and a second wafer transporter 163 movable in the X-direction is disposed in second interface station 113b.

As illustrated in FIG. 4, an eighth processing unit group $G_8$ configured such that a buffer cassette OUTBR for carrying-out which temporarily accommodates the semiconductor wafer W carried out from exposure device 114, a buffer cassette INBR for carrying-in which temporarily accommodates the semiconductor wafer W to be transported to exposure device 114, and a perimeter exposure device WEE, are disposed sequentially from the bottom to be stacked on each other, is disposed at the rear side of first wafer transporter 162. Buffer cassette INBR for carrying-in and buffer cassette OUTBR for carrying-out is adapted to be able to accommodate a plurality of sheets, for example 25 sheets, of the semiconductor wafer W.

Further, as illustrated in FIG. 3, a ninth processing unit group $G_9$ configured such that a high accuracy temperature control unit CPL-$G_9$ formed of two stages and a transition unit TRS-$G_9$ are disposed sequentially from the bottom to be stacked on each other, is disposed at the front side of first wafer transporter 162

As illustrated in FIG. 2, first wafer transporter 162 includes a fork 162a for delivering wafer, and fork 162a is movable in the Z-direction, rotatable in the θ-direction, and can freely advance or retreat in the X-Y plane. Fork 162a can selectively access each of the units of fifth processing unit group $G_5$, eighth processing unit group $G_8$ and ninth processing unit group $G_9$, and accordingly, can transport the semiconductor wafer W between these units.

Second wafer transporter 163 also includes a fork 163a for delivering wafer, and fork 163a is movable in the Z-direction, rotatable in the θ-direction, and can freely advance or retreat in X-Y plane. Fork 163a can selectively access the respective units of ninth processing unit group G9, an in-stage 114a and out-stage 114b of exposure device 114, and can transfer the semiconductor wafer W between these units.

As illustrated in FIG. 3, a central control unit 119 which controls coating and development apparatus 110 in its entirety is installed at the lower part of cassette station 111. A portion other than moving image monitor camera 101 of process monitoring device 100 of the semiconductor manufacturing apparatus illustrated in FIG. 1 is disposed at central control unit 119.

With coating and development apparatus 110 configured as described above, resist application process and development process and the like for the semiconductor wafer W are executed as follows.

First, a semiconductor wafer W before being subjected to a process is taken out one by one from the wafer cassette CR by a wafer transportation mechanism 121, and the semiconductor wafer W is transported to transition unit TRS-$G_3$ disposed at processing unit group $G_3$ of processing station 112.

Subsequently, after performing a temperature adjustment process for the semiconductor wafer W with temperature adjustment unit TCP, other processes are performed including forming of antireflective film by coating unit BARC included in first processing unit group $G_1$, a heating process by heating unit HP, and a bake process by high temperature thermal processing unit BAKE. An adhesion process may be performed by an adhesion unit AD prior to forming of antireflective film on the semiconductor wafer W by coating unit BARC.

Subsequently, after performing a temperature adjustment for the semiconductor wafer W with high accuracy temperature control unit CPL-$G_4$, the semiconductor wafer W is transported to a resist application unit COT included in first processing unit group $G_1$ and subjected to a resist liquid application process.

Subsequently, semiconductor wafer W is subjected to a prebake process by prebake unit PAB installed in fourth processing unit group $G_4$ and then is subjected to a perimeter exposure process by perimeter exposure device WEE. Semiconductor wafer W is then subjected to a temperature adjustment process by, for example, high accuracy temperature control unit CPL-$G_9$. Thereafter, semiconductor wafer W is transported to exposure device 114 by second wafer transporter 163.

Semiconductor wafer W subjected to the exposure process by exposure device 114 is carried into transition unit TRS-$G_9$ by second wafer transporter 163. Thereafter, semiconductor wafer W is subjected to a postbake exposure process by post exposure bake unit PEB included in fifth processing unit group $G_5$ and then a development process by a development unit DEV included in second processing unit group $G_2$. Semiconductor wafer W is then subjected to a postbake process by postbake unit POST and to a temperature adjustment process by high accuracy temperature control unit CPL-$G_3$.

A resist patterning is performed according to the sequences as described above.

When a process monitoring is performed by process monitoring device 100 of the semiconductor manufacturing apparatus illustrated in FIG. 1, prior to beginning the process monitoring, a moving image is captured at a time when a process for the semiconductor wafer is performed normally by photographing from moving image monitor camera 101 in advance and the photographed moving image data is stored in data storage unit 104 as a normal state moving image data. A collecting process of collecting the normal state moving image data is needed to be performed for each module as well as each recipe, and further, since there is fluctuation of fluid, the collecting process of collecting the normal state moving image data is performed plural times (e.g., ten to twenty times) for a single recipe.

Figure 5:
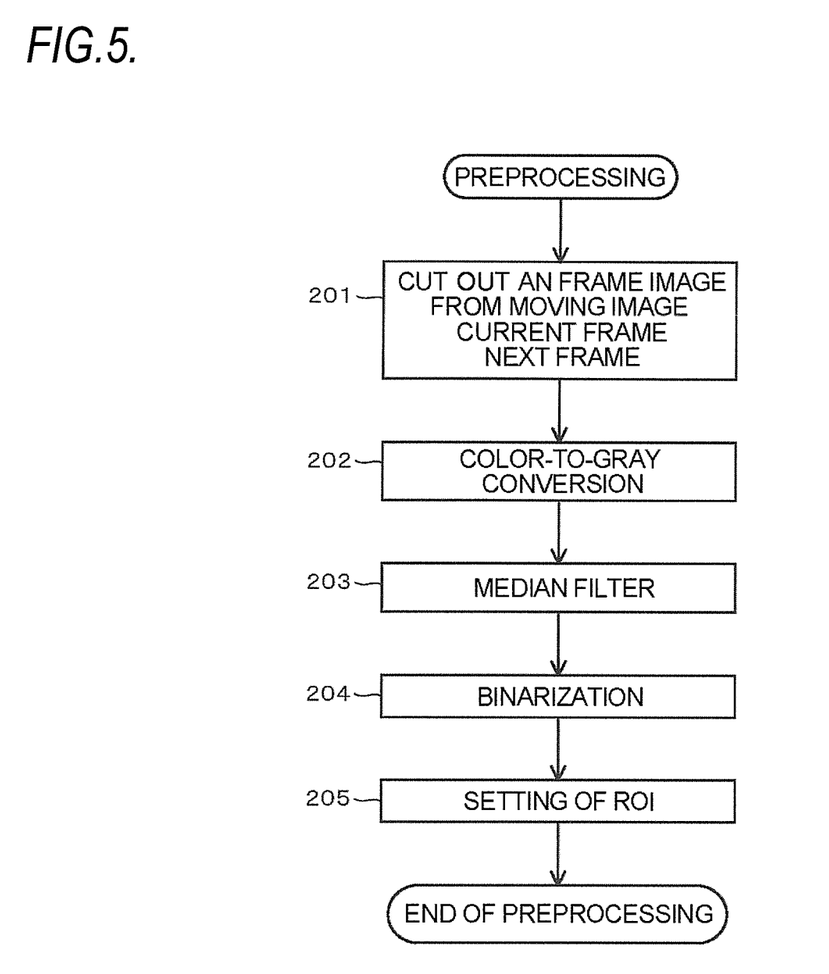
FIG. 5 is a flow chart illustrating operations of a process of an embodiment.

When receiving and storing a moving image data, a pre-process is performed as illustrated in the flowchart of FIG. 5. That is, a frame image is cut out first from the moving image (step 201). Subsequently, a gray conversion process is performed which converts color into gray (step 202), and a noise removal is performed using, for example, a median filter (step 203), and then a binarization is performed (step 204).

Figure 8:
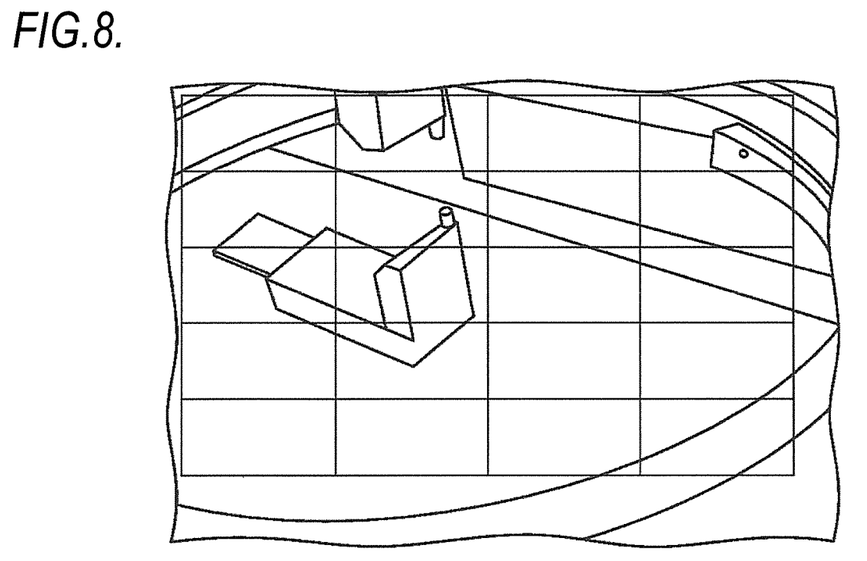
FIG. 8 is a view diagrammatically illustrating an example of a captured image.

Subsequently, a setting process of setting region of interest (ROI) is performed to determine a range of the moving image to be monitored. By doing this, the pre-processing is ended. Here, an example of the ROI setting is illustrated in FIG. 8. In the image illustrated in FIG. 8, a nozzle ejecting chemical liquid, a semiconductor wafer being rotated and a portion of a cup surrounding the semiconductor wafer are captured by photographing. Further, an element of which portion is illustrated in an upper part of FIG. 8 is a real nozzle, and an element illustrated in a lower part of FIG. 8 is an image of the nozzle moving to the surface of the semiconductor wafer. In the same figure, the inner part of a rectangle zone is ROI, and the interior of the ROI is divided into a plurality of meshes (4×5 in an example illustrated in FIG. 8). As described above, a location near the nozzle ejecting the chemical liquid and the surface of the semiconductor wafer being rotated are typically set as a desired ROI.

When the process to be monitored is captured by photographing to monitor whether or not an abnormal event of the process is occurred, the preprocess described above is performed, and a comparison process is performed that compares the normal state moving image data stored in data storage unit 104 with the captured moving image data obtained by photographing and subjected to the preprocess for each frame.

In the comparison of the normal state moving image data with the captured moving image data obtained by photographing, for example, the feature amount is extracted by the space-time-patch (ST-patch) feature amount extraction, and the difference between feature amount vector in each frame and feature amount vectors of corresponding frame in the normal state moving image data is calculated as a norm or a scalar amount of distance. The scalar amount is treated quantitatively as an abnormality level.

Figure 6:
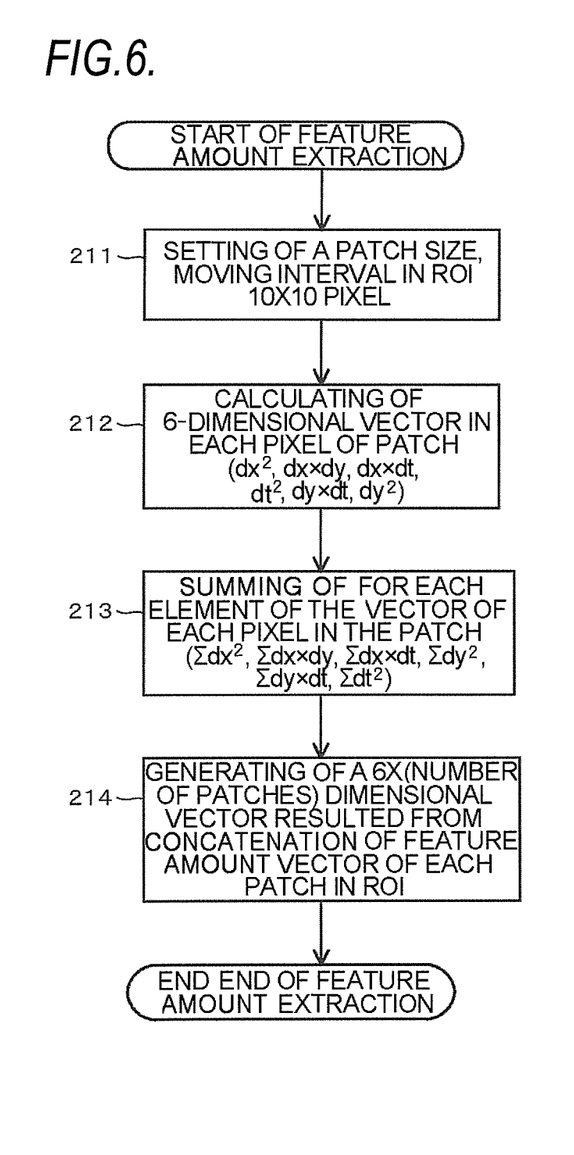
FIG. 6 is a flow chart illustrating operations of another process of the embodiment.

FIG. 6 is a flow chart illustrating the process when performing such a feature amount extraction. As illustrated in FIG. 6, in the feature amount extraction, a setting process of setting a patch size or a moving interval within ROI is performed. This setting value is, for example, 10×10 pixels (step 211).

Subsequently, six dimensional vector of $dx^2$, $dx \times dy$, $dx \times dt$, $dt^2$, $dy \times dt$, $dy^2$ is calculated for each pixel in the patch (step 212).

Thereafter, sum ($\Sigma dx^2$, $\Sigma dx \times dy$, $\Sigma dx \times dt$, $\Sigma dy^2$, $\Sigma dy \times dt$, $\Sigma dt^2$) of each element in the vector for each pixel in the patch is computed (step 213).

6× (the number of patches) dimensional vector resulted from concatenation of feature amount vector of each patch within ROI is generated (step 214).

Figure 7:
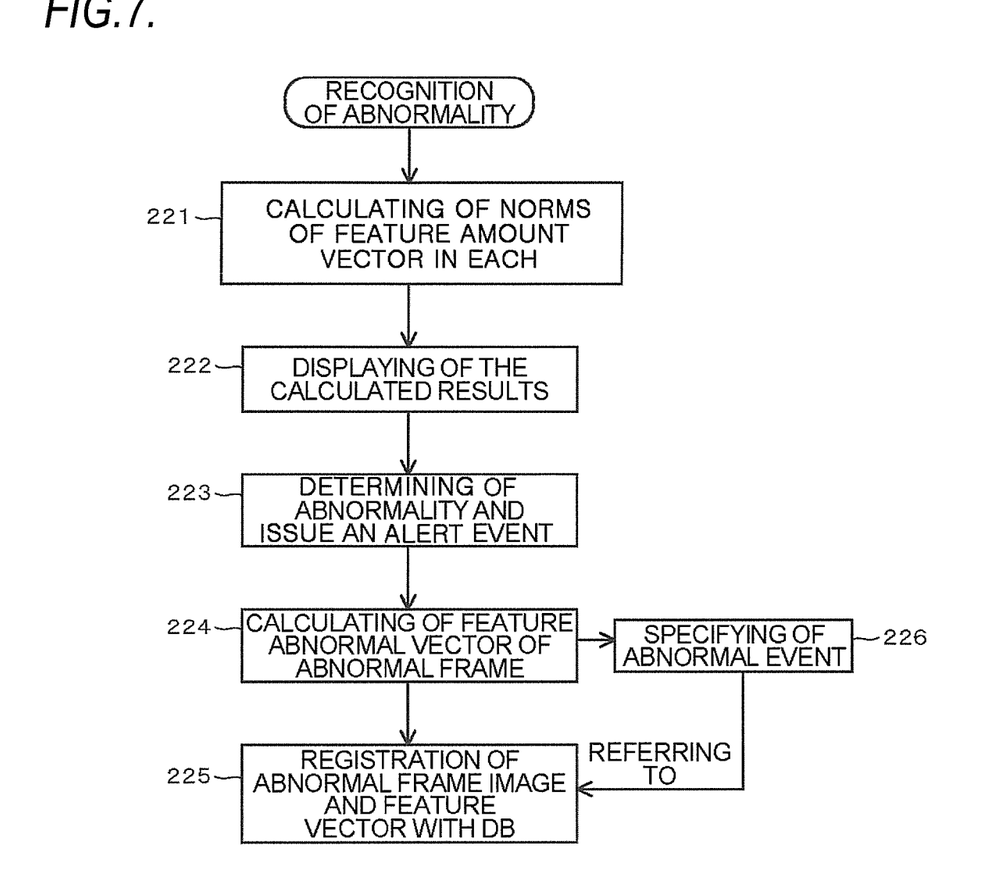
FIG. 7 is a flow chart illustrating operations of still another process of the embodiment.

FIG. 7 is a flow chart illustrating a process in which abnormality recognition is performed based on the feature amount vector generated as described above. As illustrated in FIG. 7, a feature amount vector in each frame and a norm of the feature amount vector of corresponding frame in a normal state moving image data are calculated first (step 221). The calculated norm becomes a guideline indicating an abnormality level.

Subsequently, the calculated result is displayed using, for example, time-series graph format on diagnosis result display unit 106 illustrated in FIG. 1 by being associated with a position of frame of the moving image data obtained by photographing (step 222). Examples of these displayed results are illustrated in FIGS. 9A and 9B.

Figure 9:
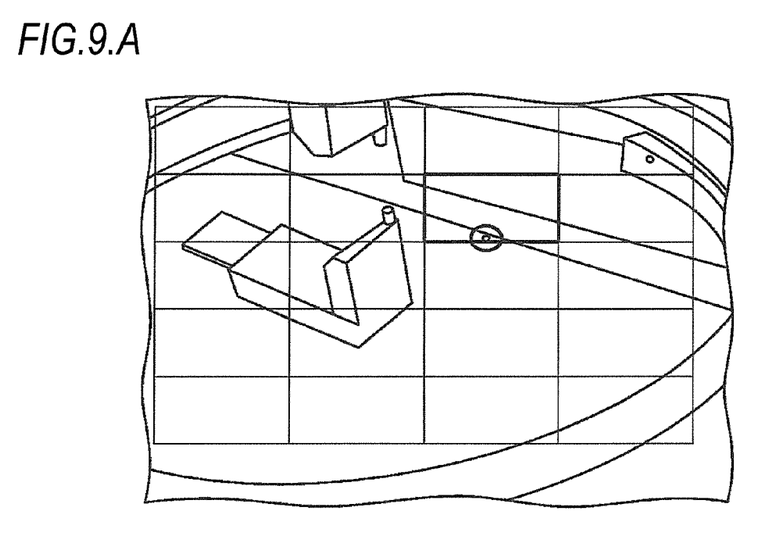
FIGS. 9A and 9B are views diagrammatically illustrating, respectively, an example of a captured image.

FIG. 9A illustrates an example of one frame of the captured moving image in which an image around a nozzle which applies developing solution on the semiconductor wafer is represented. In FIG. 9A, the inner part of a rectangle zone is ROI, and the interior of the ROI is divided into a plurality of meshes (4×5 in an example illustrated in FIGS. 9A and 9B). Further, splash of rinsing liquid is generated in an area surrounded with a circle depicted in FIG. 9A in the frame of captured moving image. The rinsing liquid splash refers to a phenomenon in which the ejected chemical liquid is scattered beside the semiconductor wafer and becomes a large liquid droplet to strike the wall of the cup surrounding the semiconductor wafer to be spattered and fallen on the semiconductor wafer, and is likely to destroy the resist pattern formed on the semiconductor wafer.

Figure 9B:
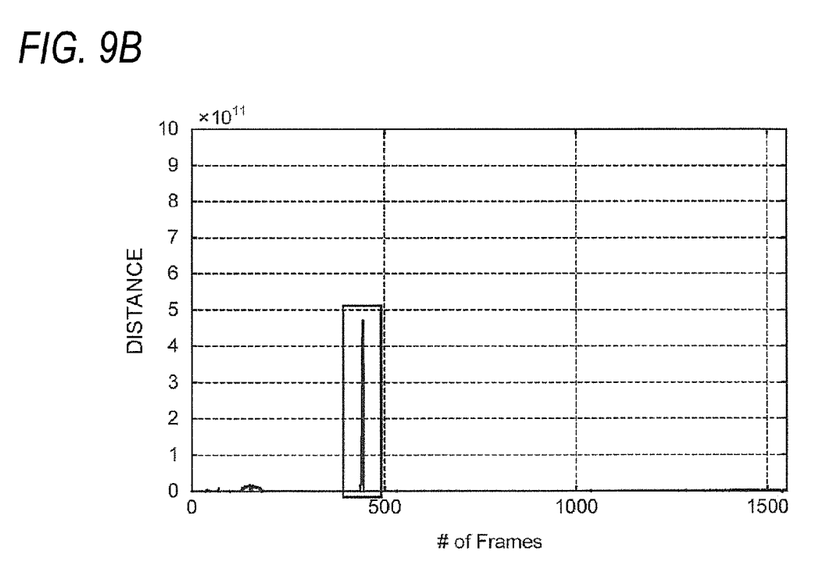

The FIG. 9B illustrates the calculated norm of the feature amount vector of a frame of the captured moving image and the calculated norm of the feature amount vector of corresponding frame in the normal state moving image data. The axis of ordinates represents a norm distance and the axis of abscissas represents number of frame. In this case, an image corresponding to the moving image illustrated in FIG. 8 is a corresponding normal state moving image data. As illustrated in FIG. 9B, the norm distance is protruded in a frame where the rinsing liquid splash is generated. Accordingly, it is possible to detect the occurrence of an abnormal event.

In this case, the graph illustrated in FIG. 9B and a frame of a captured moving image illustrated in FIG. 9A are associated with each other, and the frame of the captured moving image illustrated in FIG. 9A is displayed by designating (e.g., by clicking mouse) a peak position on the graph illustrated in FIG. 9B. Therefore, it is possible to readily recognize whether or not an abnormal event is occurred by understanding the graph illustrated in FIG. 9B. It is also possible to readily identify the frame of the captured moving image indicating that the abnormal event is occurred by designating (e.g., by clicking mouse) a position where the abnormal event is occurred. By doing this, it is possible to readily identify that the abnormal event is an occurrence of rinsing liquid splash.

Further, abnormal events, such as for example, liquid droplet generation, surface fluctuation, and developing solution splash, in addition to the rinsing liquid splash, are occurred in the development apparatus. The liquid droplet generation is an event that liquid ejected from a nozzle forms a droplet and rolls on to the semiconductor wafer, and when the liquid droplet stays to adhere on the semiconductor wafer, a resist pattern formed in a development process is likely to break down. The surface fluctuation is a phenomenon in which liquid surface is swinging, for example, in a case where an amount of ejection from the nozzle is excessively large, and irregularities are likely to occur. The developing solution splash is a phenomenon in which, for example, an ejection pressure from the nozzle is too high to cause the chemical liquid to be splashed, and when the chemical liquid falls on to the semiconductor wafer, a resist pattern formed on the semiconductor wafer is likely to break down.

Further, in the present embodiment, a threshold value for an abnormal value is set in learning abnormality determination processing unit 105 in advance. When a calculated value is compared with the threshold value for the abnormal value in learning abnormality determination processing unit 105, if the calculated value exceeds the threshold value for the abnormal value, apparatus event issuing unit 107 and learning abnormality determination processing unit 105 issue an alert message to the purport that an abnormal event is occurred (step 223). By doing this, a module of coating and development apparatus 110 in which an abnormal event is occurred is stopped to prevent semiconductor wafers for which the processing state is bad from being manufactured in large quantities.

Further, learning abnormality determination processing unit 105 calculates a feature amount vector of an abnormal frame (step 224) and registers image of the abnormal frame and the feature amount vector in a database DB.

Further, after a sufficient amount of data for the abnormal event is registered with the database DB, the database DB is retrieved to specify the abnormal event from the calculated feature amount vector of the abnormal frame (step 225).

Figure 10:
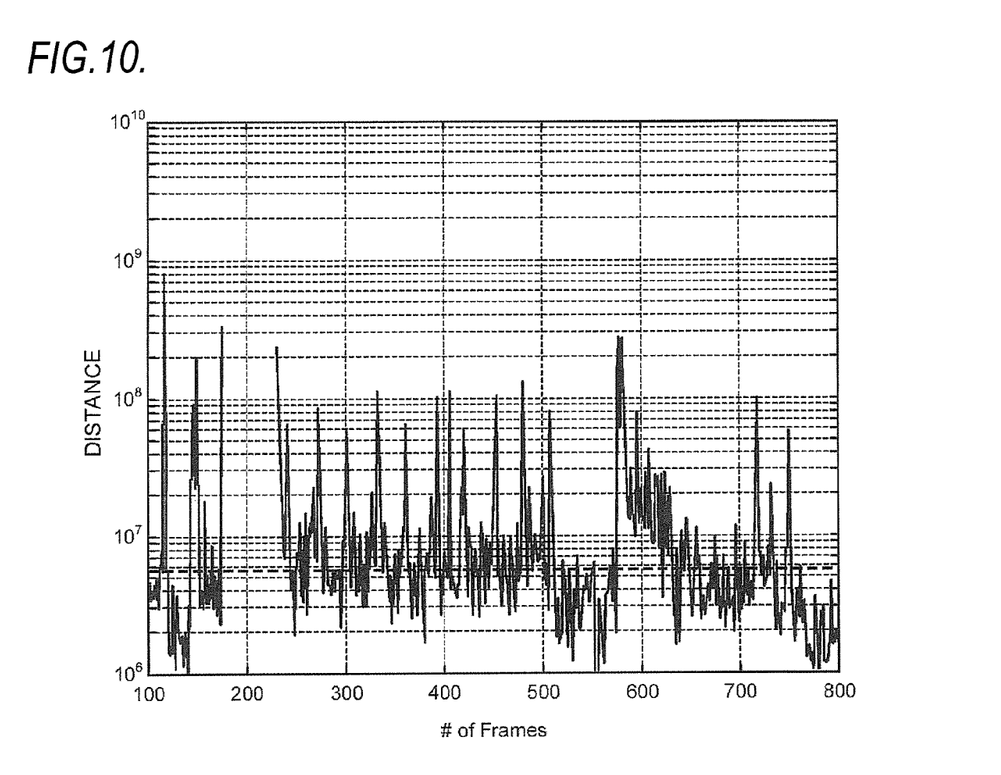
FIG. 10 is a view diagrammatically illustrating an example of a resultant image of an abnormal level calculation.
Figure 11:
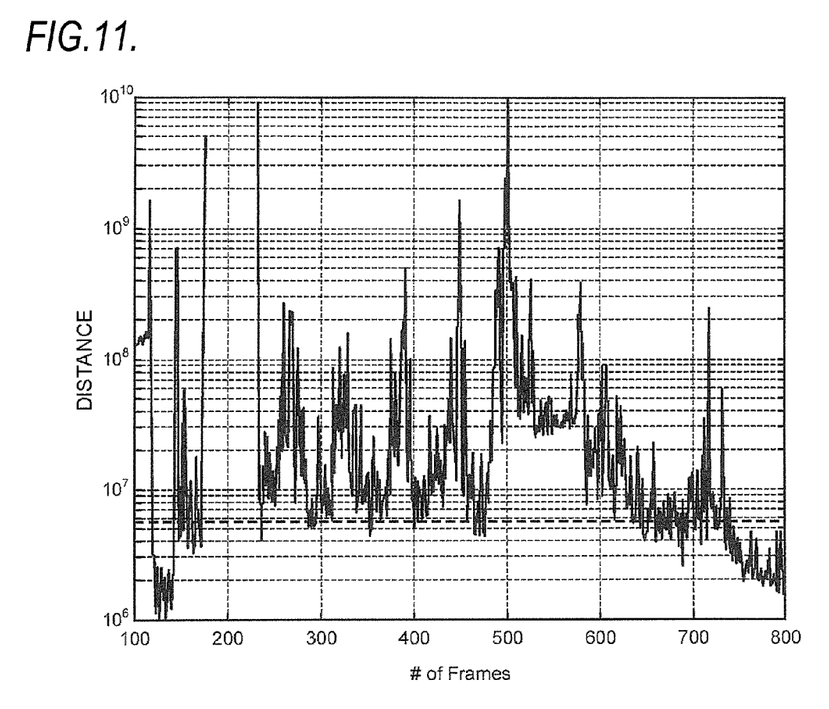
FIG. 11 is a view diagrammatically illustrating an example of a resultant image of another abnormal level calculation.
Figure 12:
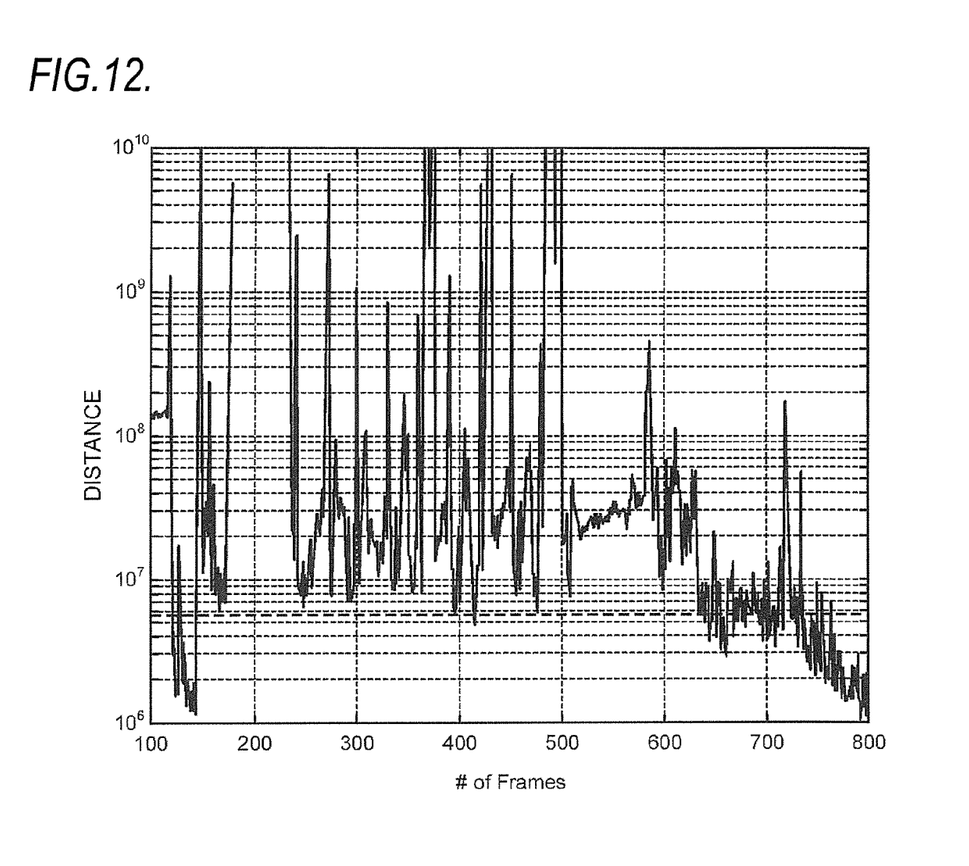
FIG. 12 is a view diagrammatically illustrating an example of a resultant image of still another abnormal level calculation.

The graph of FIG. 10 illustrates a monitored result obtained when a normal process is performed by defining the axis of ordinates as a distance induced by norm and the axis of abscissas as the number of frame. In the meantime, FIGS. 11 and 12 illustrate monitored results obtained in a case where the recipe is changed to cause the abnormal event to be generated. The axis of ordinates is represented in a logarithmic scale, and when the abnormal event is occurred, it can be found out that abnormality level is changed entirely in one order of magnitude as compared to a normal process. Therefore, the threshold value can be set to a value between a peak appeared in FIG. 10 and peaks appeared in FIGS. 11 and 12, to reliably detect occurrence of the abnormal event.

However, among the abnormal events, in addition to an event which directly advances into a defective process to cause a product manufactured by the process in which an abnormal event is occurred to be defective, there is an abnormality predictive event which does not cause a product manufactured by the process in which the abnormality predictive event is occurred to be defective. But when the process in which the abnormality predictive event is occurred continues as it is by the semiconductor manufacturing apparatus, abnormality predictive event may soon become an abnormal event to cause a defective product to come out.

In order to detect the abnormality predictive event to predict an abnormality prediction, a threshold value for determining abnormality predictive event is needed to be stored in an abnormality prediction registration database in advance and the difference in occurrence of a normal event or abnormality predictive event when monitoring a moving image based on the stored threshold can be determined.

Although, in the embodiment described above, an explanation is made for monitoring a case where liquid is supplied from a nozzle to the semiconductor wafer by exemplifying coating and development apparatus 110 which performs a process for the application process of photoresist and a development process of photoresist on a semiconductor wafer, the present disclosure may similarly be applied to monitoring another process performed in the semiconductor manufacturing apparatus.

For example, the present disclosure may similarly be applied to a monitoring process of monitoring a transporting system which transports the semiconductor wafer in the semiconductor manufacturing apparatus. For monitoring transport system, when a positional deviation of the semiconductor wafer on the transport apparatus is monitored, if it is determined that an abnormal event is occurred, transportation of a semiconductor wafer is stopped and thus it is possible to prevent the semiconductor wafer from being collided with a structure to break down in advance.

Further, a substrate to be processed is not limited to a semiconductor wafer, but the present disclosure may also applied to, for example, monitoring the process for a substrate for liquid crystal display device, and a substrate for organic EL.

Further, the present disclosure is not limited to the above-described embodiment, and various changes may be made thereto.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A process monitoring device of a semiconductor manufacturing apparatus comprising:
    a storage unit configured to store a normal state moving image data including a plurality of image frames and indicating a normal state of a process performed on a substrate in the semiconductor manufacturing apparatus by cutting out each of the plurality of image frames of the normal state moving image data;
    an image capturing unit configured to capture a moving image of a state of the process to be monitored to acquire a moving image data including a plurality of image frames;
    an abnormality level calculation unit configured to extract a feature amount for each frame of the moving image data acquired by the image capturing unit and each frame of the normal state moving image data, and calculate an abnormality level based on a difference between the extracted feature amount of the moving the image data acquired by the image capturing unit and the normal state moving image data; and
    a display unit configured to display the abnormality level calculated by the abnormality level calculation unit in association with a frame position of the moving image data acquired by the image capturing unit, allowing a user to identify a position where an abnormal event is occurred.

2. The process monitoring device in the semiconductor manufacturing apparatus of claim 1, wherein the display unit displays a change for each frame of the moving image data of the abnormality level in a graph and designates a position on the graph to display the moving image data corresponding to the designated position on the graph.

3. The process monitoring device in the semiconductor manufacturing apparatus of claim 2, further comprising:
    a threshold storing unit that stores a threshold value of the abnormality level; and
    an abnormality determination unit that compares the threshold value stored in the threshold storing unit with the abnormality level calculated by the abnormality level calculation unit, and if the calculated abnormality level exceeds the threshold value, issues an abnormality occurrence alert.

4. The process monitoring device in the semiconductor manufacturing apparatus of claim 1, wherein the abnormality level calculation unit calculates the abnormality level from a ST-patch feature.

5. A process monitoring method in a semiconductor manufacturing apparatus comprising:
    storing a normal state moving image data including a plurality of image frames in a storage unit indicating a normal state of a process performed on a substrate by cutting out each of the plurality of image frames of the normal state moving image data;

capturing a moving image of a state of the process to be monitored to acquire a moving image data including a plurality of image frames;

extracting a feature amount for each frame of the moving image data acquired by the image capturing unit and each frame of the normal state moving image data and calculating an abnormality level based on a difference between the feature amount of the moving image data acquired by the image capturing unit and the normal state moving image data extracted at the extracting; and displaying the abnormality level calculated at the extracting in association with a frame position of the moving image data acquired by the image capturing unit, allowing a user to identify a position where an abnormal event is occurred.

6. The process monitoring method in the semiconductor manufacturing apparatus of claim 5, wherein the display unit displays a change for each frame of the moving image data of the abnormality level in a graph and designates a position on the graph to display the moving image data corresponding to the designated position on the graph.

7. The process monitoring method in the semiconductor manufacturing apparatus of claim 6, further comprising:

storing a threshold value of the abnormality level; and issuing an abnormality occurrence alert when the calculated abnormality level exceeds the threshold value after comparing the threshold value stored in the threshold storing unit with the abnormality level calculated by the abnormality level calculation unit.

8. The process monitoring method in the semiconductor manufacturing apparatus of claim 5, wherein the calculating calculates the abnormality level from a ST-patch feature.

9. A semiconductor manufacturing apparatus including a process monitoring device comprising:

a storage unit configured to store a normal state moving image data including a plurality of image frames and indicating a normal state of the process performed on a substrate in the semiconductor manufacturing apparatus by cutting out each of the plurality of image frames of the normal state moving image data;

an image capturing unit configured to capture a moving image of a state of a process to be monitored to acquire a moving image data including a plurality of image frames;

an abnormality level calculation unit configured to extract a feature amount for each frame of the moving image data acquired by the image capturing unit and each frame of the normal state moving image data, and calculate an abnormality level based on a difference between the extracted feature amount of the moving image by the image capturing unit and the normal state moving image data; and a display unit configured to display the abnormality level calculated by the abnormality level calculation unit in association with a frame position of the moving image data acquired by the image capturing unit, allowing a user to identify a position where an abnormal event is occurred.

\* \* \* \* \*